US010469636B1

(12) United States Patent
Lee et al.

(10) Patent No.: US 10,469,636 B1
(45) Date of Patent: Nov. 5, 2019

(54) SIGNAL ENHANCEMENT DEVICE APPLYING ANTENNA MODULE AND METHOD FOR MANUFACTURING THE SAME

(71) Applicant: Cheng Uei Precision Industry Co., Ltd., New Taipei (TW)

(72) Inventors: James Cheng Lee, La Habra, CA (US); Kuo Yang Wu, New Taipei (TW); Wen Bing Hsu, New Taipei (TW); Jui Hui Lin, New Taipei (TW); Kuo Wei Chang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/249,928

(22) Filed: Jan. 17, 2019

Related U.S. Application Data

(60) Provisional application No. 62/703,434, filed on Jul. 26, 2018.

(51) Int. Cl.
*H04M 1/02* (2006.01)
*H04B 1/3827* (2015.01)

(52) U.S. Cl.
CPC ........ *H04M 1/0249* (2013.01); *H04B 1/3827* (2013.01); *H04M 1/026* (2013.01)

(58) Field of Classification Search
CPC .......... H04W 64/00; H04W 4/80; H01Q 1/22; H01Q 21/0093; H01Q 13/10; H01Q 13/106; H01Q 13/18; H01Q 21/0043; H01Q 21/005
See application file for complete search history.

(56) References Cited

U.S. PATENT DOCUMENTS

| 6,906,674 | B2 * | 6/2005 | McKinzie, III | .......... H01Q 1/52 343/700 MS |
| 2006/0114165 | A1 * | 6/2006 | Honda | .................... H01Q 1/246 343/785 |

\* cited by examiner

*Primary Examiner* — Diane D Mizrahi
(74) *Attorney, Agent, or Firm* — Lin & Associates Intellectual Property, Inc.

(57) ABSTRACT

A signal enhancement device matched with a wireless communication device and mounted to a rear of the wireless communication device. The signal enhancement device includes an antenna module opening a plurality of narrow slots of arc shapes, and a covering portion enclosing the antenna module. The antenna module is fixed inside the covering portion. The covering portion covers the rear of the wireless communication device. A method for manufacturing the signal enhancement device includes specific steps described hereinafter. Make the antenna module which opens a plurality of narrow slots. Form a semi-manufactured product of the covering portion by an injection molding technology. Place the antenna module on the semi-manufactured product of the covering portion, and continue proceeding molding the covering portion by the injection molding technology to complete molding the whole covering portion, so that the antenna module is molded inside and is fixed inside the covering portion.

14 Claims, 5 Drawing Sheets

SIGNAL ENHANCEMENT DEVICE APPLYING ANTENNA MODULE AND METHOD FOR MANUFACTURING THE SAME

BACKGROUND OF THE INVENTION

1. Field of the Invention

The present invention generally relates to a signal enhancement device, and more particularly to a signal enhancement device applying an antenna module and featured with a signal enhancement function, and a method for manufacturing the signal enhancement device.

2. The Related Art

Due to conveniences of wireless communication devices, such as smart phones, in communication applications, the smart phones have gradually become necessities in people's lives. The smart phones proceed communicating through a Long Term Evolution (LTE) technology for using various functions.

However, when a user proceeds a hand-held operation on the smart phone, intensities of LTE signals of the smart phone will be decreased, so the smart phones receive the LTE signals poorly to make the user have no way of using the smart phones normally.

Therefore, it is necessary to provide an innovative signal enhancement device applying an antenna module and applied in the wireless communication device, so that intensities of the LTE signals of the wireless communication device are able to be enhanced to improve communication quality of the wireless communication device for ensuring that a user use the wireless communication device normally.

SUMMARY OF THE INVENTION

An object of the present invention is to provide a signal enhancement device matched with a wireless communication device and mounted to a rear of the wireless communication device. The signal enhancement device includes an antenna module opening a plurality of narrow slots of arc shapes, and a covering portion enclosing the antenna module. The antenna module is fixed inside the covering portion. The covering portion covers the rear of the wireless communication device.

Another object of the present invention is to provide a method for manufacturing a signal enhancement device which includes an antenna module, and a covering portion enclosing the antenna module. The method for manufacturing the signal enhancement device includes specific steps described hereinafter. Make an antenna module which opens a plurality of narrow slots of arc shapes. Form a semi-manufactured product of a covering portion of the signal enhancement device by an injection molding technology. Place the antenna module on the semi-manufactured product of the covering portion, and continue proceeding molding the covering portion by the injection molding technology to complete molding the whole covering portion, so that the antenna module is molded inside and is fixed inside the covering portion.

Another object of the present invention is to provide an antenna module applied in a signal enhancement device. The antenna module includes a base slice, and a plurality of narrow slots opened in the base slice. The plurality of the narrow slots are of arc shapes and arranged in two rows along a left-to-right direction. A distance between two ends of each of the narrow slots of one of the two rows is larger than a distance between two ends of each of the narrow slots of the other row, and an arc length of each of the narrow slots of the one of the two rows is larger than an arc length of each of the narrow slots of the other row.

As described above, when the signal enhancement device is mounted to the wireless communication device, the antenna module is coupled with a communication antenna of the wireless communication device, and the antenna module is fixed inside the covering portion of the signal enhancement device to increase an area of transmitting and receiving the signals of the wireless communication device, the intensities of the LTE signals of the wireless communication device are enhanced by virtue of a metal material characteristic of the antenna module and an arrangement of the plurality of the narrow slots of the signal enhancement device to improve communication quality of the wireless communication device for ensuring that a user use the wireless communication device normally. Furthermore, a size of the antenna module is designed to be limited within a size of the covering portion to effectively control a volume of the signal enhancement device of the wireless communication device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
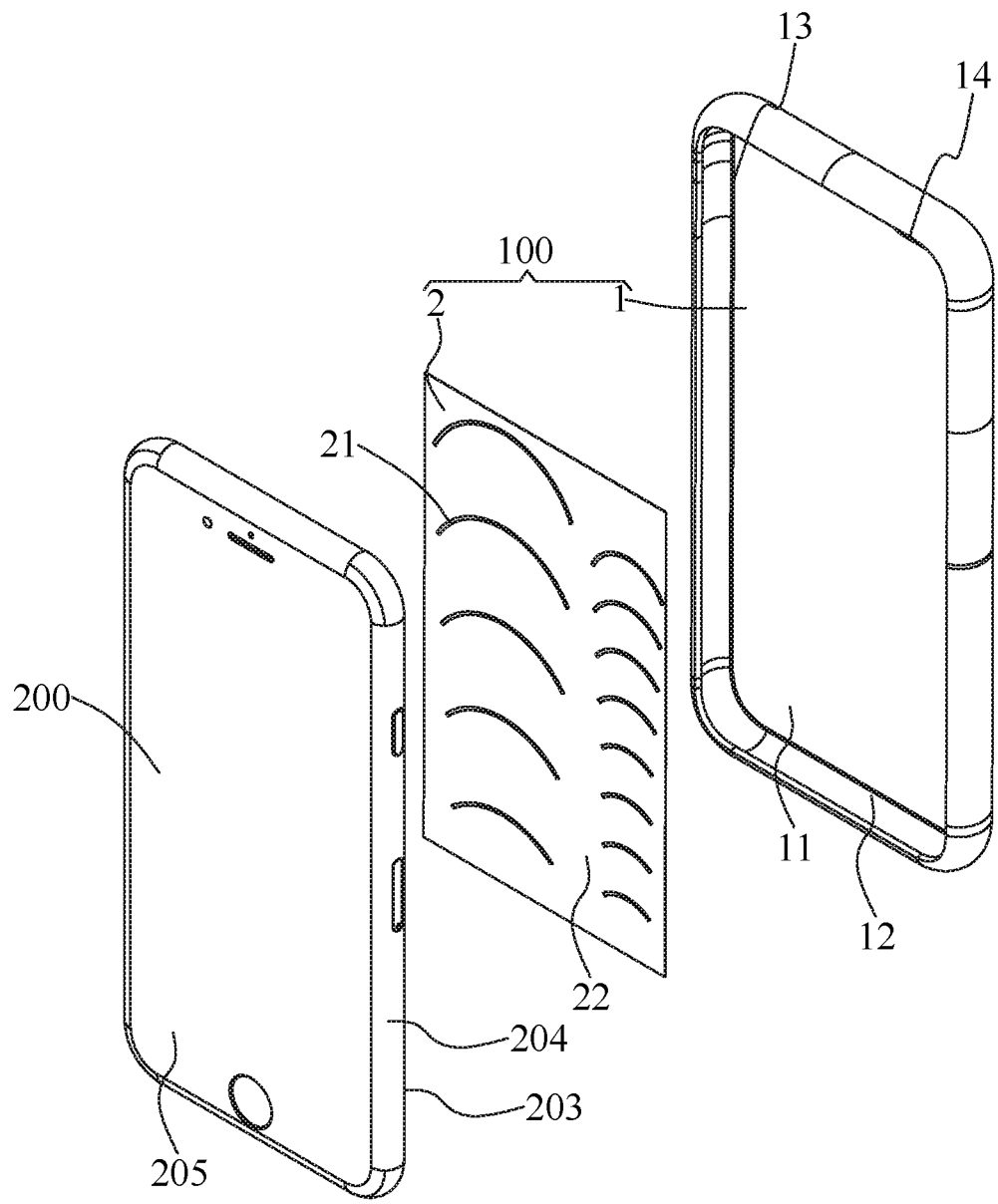
FIG. 1 is an exploded perspective view showing a wireless communication device and a signal enhancement device in accordance with a preferred embodiment of the present invention.
Figure 2:
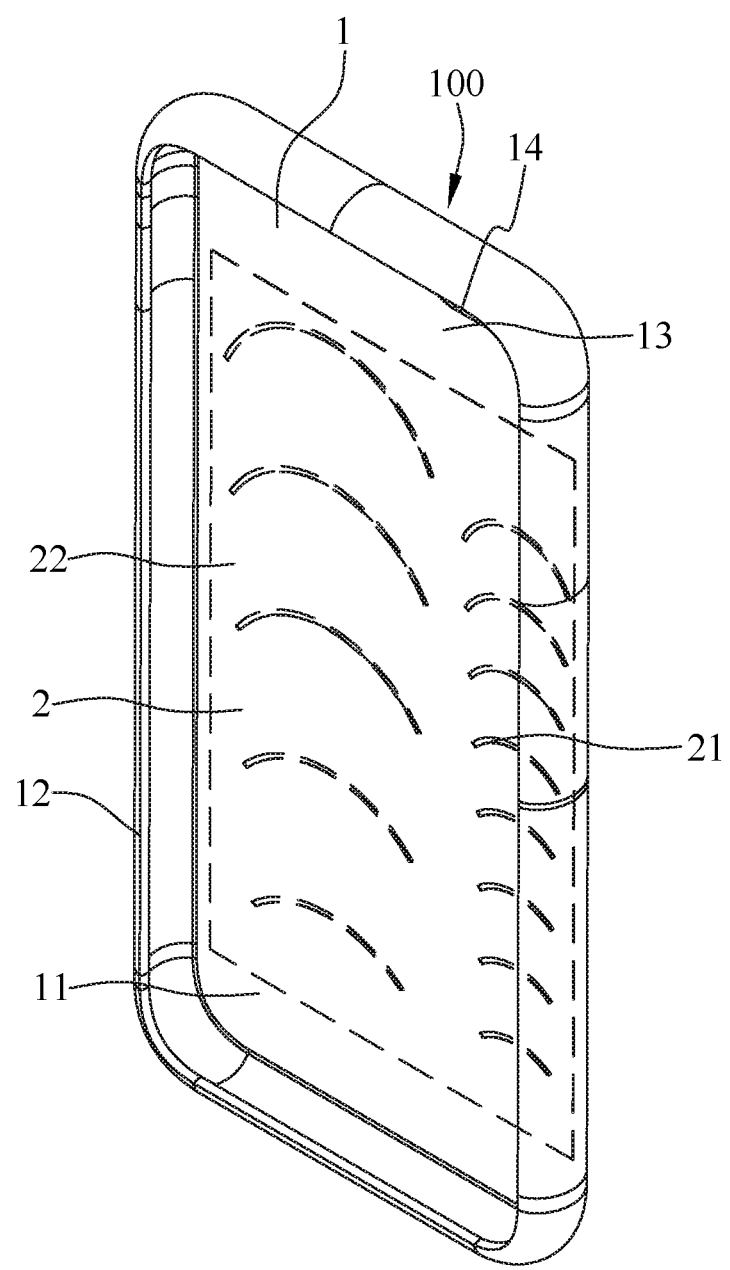
FIG. 2 is a perspective view of the signal enhancement device of FIG. 1.
Figure 3:
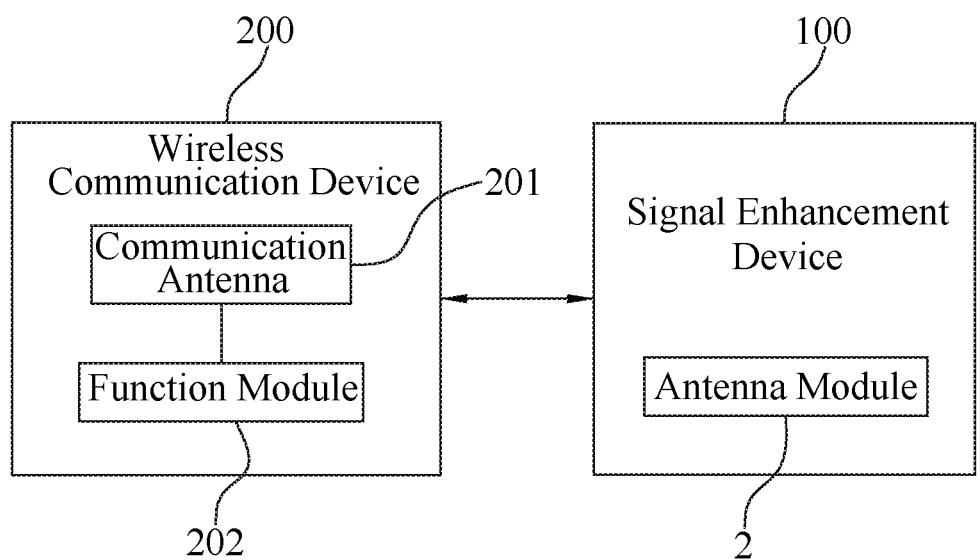
FIG. 3 is a block diagram showing the signal enhancement device and the wireless communication device of FIG. 1.
Figure 4:
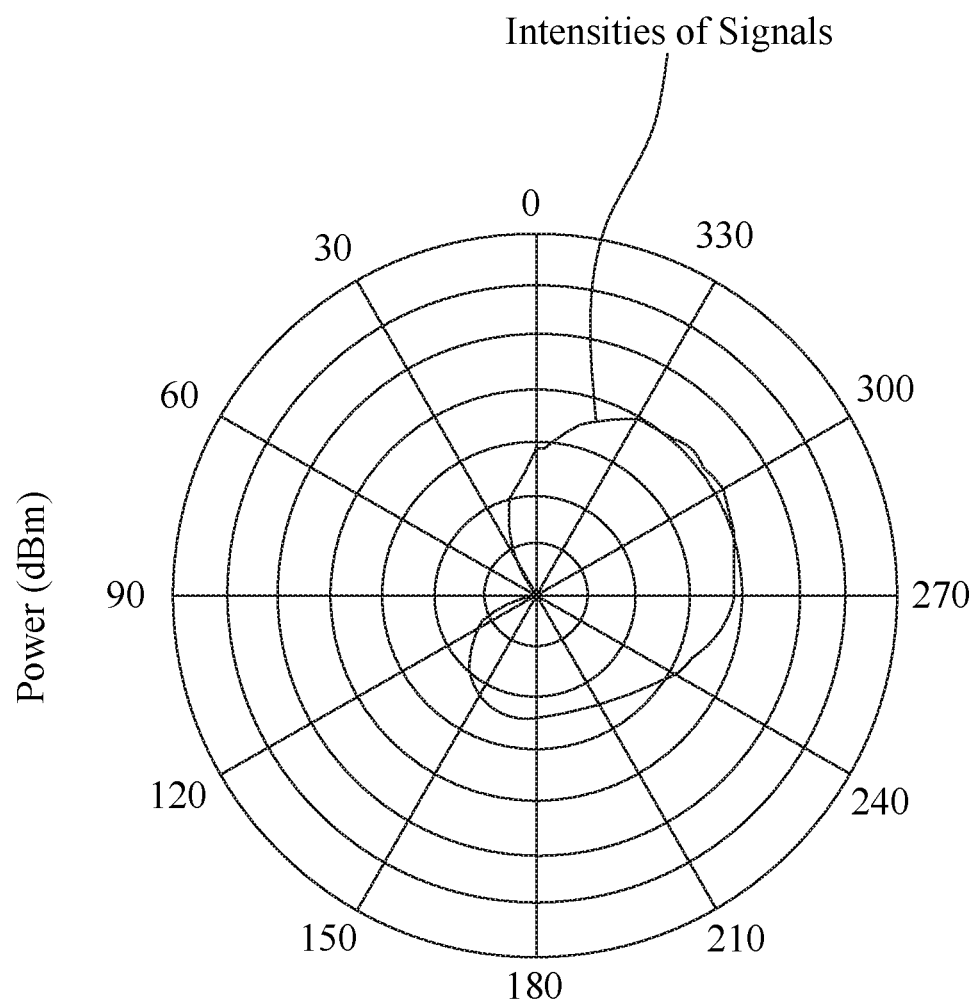
FIG. 4 shows a radiation pattern of LTE signals of the wireless communication device, wherein the signal enhancement device is without being mounted to the wireless communication device of FIG. 1.
Figure 5:
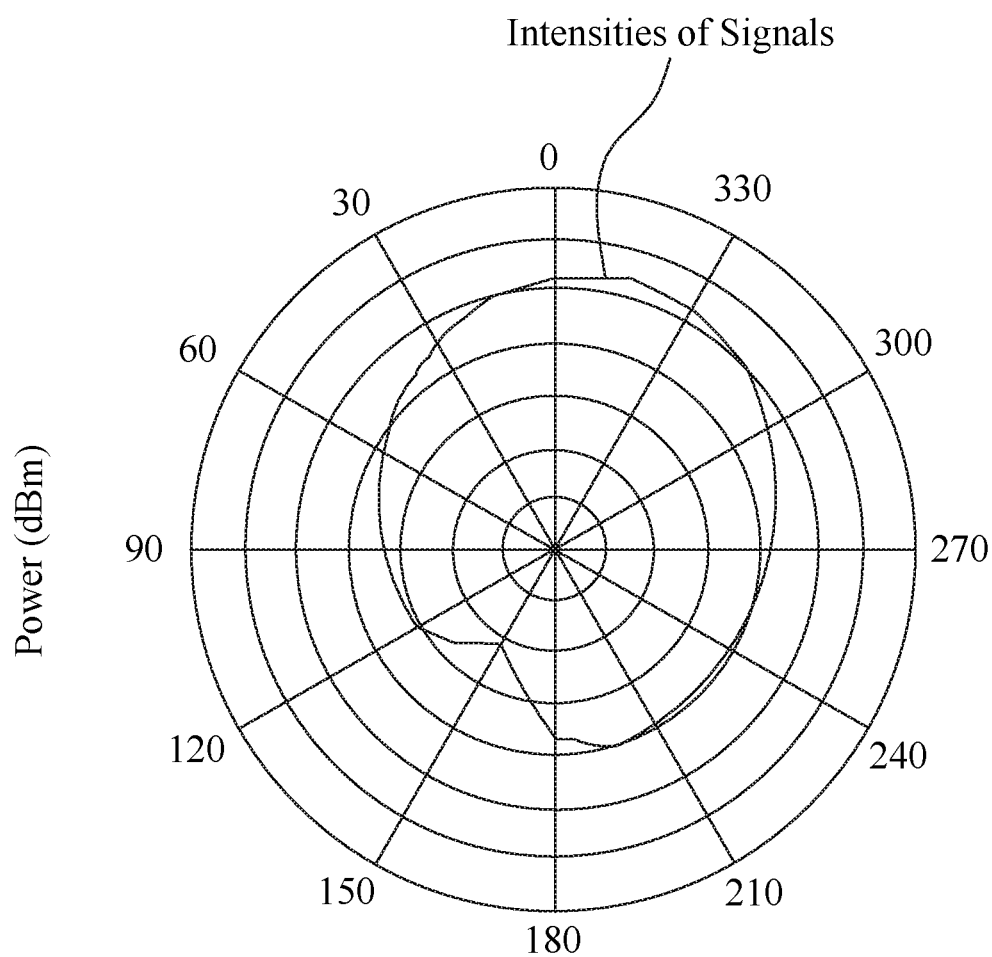
FIG. 5 shows another radiation pattern of the LTE signals of the wireless communication device, wherein the signal enhancement device is mounted to the wireless communication device of FIG. 1.

With reference to FIG. 1 to FIG. 3, a signal enhancement device 100 in accordance with a preferred embodiment of the present invention is shown. The signal enhancement device 100 is adapted for being applied in and mounted to a wireless communication device 200. The signal enhancement device 100 is matched with the wireless communication device 200. In the preferred embodiment, the wireless communication device 200 is a smart phone. The signal enhancement device 100 is mounted to a rear of the wireless communication device 200 which is the smart phone. Specifically, the signal enhancement device 100 includes a covering portion 1 and an antenna module 2. The wireless communication device 200 includes a communication antenna 201, and a function module 202 connected with the communication antenna 201.

The signal enhancement device 100 applies the antenna module 2 to realize a signal receiving and transmitting function. The wireless communication device 200 realizes a communication function by virtue of the communication antenna 201. The antenna module 2 is coupled with the communication antenna 201 of the wireless communication device 200 to transmit and receive signals, so that intensities of the signals of the wireless communication device 200 are able to be enhanced to improve communication quality of the wireless communication device 200. The signals of the wireless communication device 200 include LTE (Long Term Evolution) signals.

With reference to FIG. 1 to FIG. 3 again, the covering portion 1 covers the rear of the wireless communication device 200. The covering portion 1 has a rectangular base board 11, a peripheral wall 12 protruded frontward from a periphery of the base board 11, and a receiving space 13 formed between the base board 11 and the peripheral wall 12. A top of the base board 11 opens a camera hole 14 for exposing a camera (not shown) of the wireless communication device 200. The wireless communication device 200 has a rear surface 203, a front surface 205 located in front of the rear surface 203, and a connecting portion 204 connected between the rear surface 203 and the front surface 205. The communication antenna 201 and the function module 202 are disposed among the rear surface 203, the front surface 205 and the connecting portion 204. The wireless communication device 200 is received in the receiving space 13 of the covering portion 1. The base board 11 covers the rear surface 203 of the wireless communication device 200. The peripheral wall 12 of the covering portion 1 surrounds the connecting portion 204 of the wireless communication device 200. The front surface 205 of the wireless communication device 200 is exposed out of the covering portion 1 of the signal enhancement device 100. The communication antenna 201 is disposed inside the wireless communication device 200 and is close to the rear surface 203.

With reference to FIG. 1 and FIG. 2, the antenna module 2 is a metal sheet. Specifically, the metal sheet is a copper sheet. The covering portion 1 encloses the antenna module 2. The antenna module 2 is fixed inside the covering portion 1. The antenna module 2 is fixed inside the base board 11 and is enclosed by the base board 11. A size of the antenna module 2 is designed to be limited within a size of the covering portion 1. The antenna module 2 is applied in and is designed as a part of the signal enhancement device 100. The antenna module 2 opens a plurality of narrow slots 21. The antenna module 2 has a base slice 22. The base slice 22 is the metal sheet. The base slice 22 of the antenna module 2 opens the plurality of the narrow slots 21, so the plurality of the narrow slots 21 are opened in the base slice 22. The plurality of the narrow slots 21 are of arc shapes. Each of the plurality of the narrow slots 21 is arched upward. In this preferred embodiment, the plurality of the narrow slots 21 are arranged in two rows along a left-to-right direction. A distance between two ends of each of the narrow slots 21 of one of the two rows is larger than a distance between two ends of each of the narrow slots 21 of the other row, and an arc length of each of the narrow slots 21 of the one of the two rows is larger than an arc length of each of the narrow slots 21 of the other row. The two rows of the plurality of the narrow slots 21 are divided into a first row of the narrow slots 21 and a second row of the narrow slots 21 arranged along the left-to-right direction. The first row of the narrow slots 21 include five narrow slots 21 arranged longitudinally seen from a front view of the antenna module 2. The second row of the narrow slots 21 include eight narrow slots 21 arranged longitudinally seen from the front view of the antenna module 2. The second row of the narrow slots 21 are disposed on the right of the first row of the narrow slots 21. Each narrow slot 21 of the first row is larger than each narrow slot 21 of the second row in size. A distance between two ends of each narrow slot 21 of the first row is larger than a distance between two ends of each narrow slot 21 of the second row. An arc length of each narrow slot 21 of the first row is larger than an arc length of each narrow slot 21 of the second row. An up-down distance between each two nearest narrow slots 21 of the first row is larger than an up-down distance between each two nearest narrow slots 21 of the second row.

With reference to FIG. 1 to FIG. 3, a method for manufacturing the signal enhancement device 100 is described as follows. Specific steps of the method for manufacturing the signal enhancement device 100 are described as follows. Making the antenna module 2 which opens the plurality of the narrow slots 21 of the arc shapes. When the signal enhancement device 100 is molded, form a semi-manufactured product of the covering portion 1 by an injection molding technology in advance, and then place the antenna module 2 on the semi-manufactured product of the covering portion 1, and continue proceeding molding the covering portion 1 by the injection molding technology to complete molding the whole covering portion 1, so that the antenna module 2 is molded inside and is fixed inside the covering portion 1. The signal enhancement device 100 in accordance with the preferred embodiment of the present invention is completed being molded.

With reference to FIG. 1 to FIG. 5, FIG. 2 shows a radiation pattern of the LTE (Long Term Evolution) signals of the wireless communication device 200 in which the signal enhancement device 100 is without being mounted. FIG. 3 shows a radiation pattern of the LTE (Long Term Evolution) signals of the wireless communication device 200 in which the signal enhancement device 100 is mounted. It can be seen that intensities of the LTE signals of the wireless communication device 200 are enhanced after the signal enhancement device 100 is mounted in the wireless communication device 200. So the signal enhancement device 100 is featured with a signal enhancement function to enhance the intensities of the LTE signals of the wireless communication device 200, and correspondingly the wireless communication device 200 is featured with the signal enhancement function.

As described above, when the signal enhancement device 100 is mounted to the wireless communication device 200, the antenna module 2 is coupled with the communication antenna 201 of the wireless communication device 200, and the antenna module 2 is fixed inside the covering portion 1 of the signal enhancement device 100 to increase an area of transmitting and receiving the signals of the wireless communication device 200, the intensities of the LTE signals of the wireless communication device 200 are enhanced by virtue of a metal material characteristic of the antenna module 2 and an arrangement of the plurality of the narrow slots 21 of the signal enhancement device 100 to improve communication quality of the wireless communication device 200 for ensuring that a user use the wireless communication device 200 normally. Furthermore, the size of the antenna module 2 is designed to be limited within the size of the covering portion 1 to effectively control a volume of the signal enhancement device 100 of the wireless communication device 200.

What is claimed is:

1. A signal enhancement device matched with a wireless communication device and mounted to a rear of the wireless communication device, the signal enhancement device comprising:
   an antenna module opening a plurality of narrow slots of arc shapes; and
   a covering portion enclosing the antenna module, the antenna module being fixed inside the covering portion, the covering portion covering the rear of the wireless communication device.

2. The signal enhancement device as claimed in claim 1, wherein the plurality of the narrow slots are arranged in two rows along a left-to-right direction, the two rows of the plurality of the narrow slots are divided into a first row of the narrow slots and a second row of the narrow slots arranged along the left-to-right direction.

3. The signal enhancement device as claimed in claim 2, wherein the first row of the narrow slots include five narrow slots arranged longitudinally seen from a front view of the antenna module, the second row of the narrow slots include eight narrow slots arranged longitudinally seen from the front view of the antenna module.

4. The signal enhancement device as claimed in claim 2, wherein the second row of the narrow slots are disposed on the right of the first row of the narrow slots.

5. The signal enhancement device as claimed in claim 2, wherein a distance between two ends of each narrow slot of the first row is larger than a distance between two ends of each narrow slot of the second row.

6. The signal enhancement device as claimed in claim 2, wherein an arc length of each narrow slot of the first row is larger than an arc length of each narrow slot of the second row.

7. The signal enhancement device as claimed in claim 2, wherein an up-down distance between each two nearest narrow slots of the first row is larger than an up-down distance between each two nearest narrow slots of the second row.

8. The signal enhancement device as claimed in claim 1, wherein the antenna module is a metal sheet.

9. The signal enhancement device as claimed in claim 8, wherein the metal sheet is a copper sheet.

10. The signal enhancement device as claimed in claim 1, wherein the antenna module is molded inside the covering portion.

11. The signal enhancement device as claimed in claim 1, wherein the covering portion has a rectangular base board, a peripheral wall protruded frontward from a periphery of the base board, and a receiving space formed between the base board and the peripheral wall, the wireless communication device is received in the receiving space of the covering portion.

12. The signal enhancement device as claimed in claim 11, wherein the wireless communication device has a rear surface, a front surface located in front of the rear surface, and a connecting portion connected between the rear surface and the front surface, the base board covers the rear surface of the wireless communication device, the peripheral wall of the covering portion surrounds the connecting portion of the wireless communication device, the front surface of the wireless communication device is exposed out of the covering portion.

13. The signal enhancement device as claimed in claim 1, wherein a size of the antenna module is designed to be limited within a size of the covering portion.

14. The signal enhancement device as claimed in claim 1, wherein the antenna module has a base slice, the base slice opens the plurality of the narrow slots, each of the plurality of the narrow slots is arched upward.

\* \* \* \* \*